(12) United States Patent
Miyamoto et al.

(10) Patent No.: US 6,249,505 B1
(45) Date of Patent: Jun. 19, 2001

(54) DISK DRIVE MOTOR

(75) Inventors: Eiji Miyamoto, Hikone; Harushige Osawa, Kusatsu; Masanobu Chuta, Oumihachiman, all of (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/686,424

(22) Filed: Oct. 11, 2000

Related U.S. Application Data (62) Division of application No. 09/103,727, filed on Jun. 23, 1998, now Pat. No. 6,205,110.

(30) Foreign Application Priority Data

Jun. 25, 1997 (JP) .................................................... 9-184531
Jul. 4, 1997 (JP) .................................................... 9-194820
Nov. 27, 1997 (JP) .................................................... 9-343973

(51) Int. Cl.[7] ............................. G11B 17/02; G11B 19/20
(52) U.S. Cl. .................... 369/266; 360/99.12; 360/99.08
(58) Field of Search .................................. 369/266, 264, 369/263, 258, 270, 271; 360/99.04, 99.08, 99.12, 98.08, 98.07; 74/572, 573 R, 574; 310/51, 67 R, 80

(56) References Cited

U.S. PATENT DOCUMENTS 4,800,306 * 1/1989 Oberto ................................... 310/51

FOREIGN PATENT DOCUMENTS

01220742 * 9/1989 (JP) .
82/04363 * 12/1982 (WO) .

* cited by examiner

Primary Examiner—David L. Ometz
Assistant Examiner—Angel Castro
(74) Attorney, Agent, or Firm—McCormick, Paulding & Huber LLP (57) ABSTRACT

The present invention discloses a disk drive motor comprising a rotor having an annular space formed therein coaxially with the axis of rotation, and balancing member accommodated in the annular space and capable of changing its mass distribution circumferentially along the circle of the annular space. In case of any imbalanced rotation occurring during the rotation, the balancing member temporarily gather to a portion of the annular space where the mass imbalance is taking place. However, when the motor speed exceeds the value at which resonance takes place due to coincidence between the frequency of the vibration of the balancing member and the natural frequency of the motor, the balancing members move to a position symmetrical with the point of mass imbalance to eliminate the mass imbalance, thereby suppressing the run-out.

12 Claims, 8 Drawing Sheets

DISK DRIVE MOTOR

This application is a divisional of application Ser. No. 09/103,727 filed Jun. 23, 1998, now U.S. Pat. No. 6,205,110.

BACKGROUND OF THE INVENTION

1. Field of the Invention

The present invention relates to a disk drive motor for driving recording disks and, more particularly, to a disk drive motor which is required to operate at high speed with high stability.

2. Description of the Related Art

Various types of recording disks have been proposed and used for the purpose of recording and reproduction of data, such as compact disks (CD), floppy disks (FD), magneto-optical disks (MO), mini-disks (MD), digital video disks (DVD), hard disks (HD), and so forth. Different types of recording disks employ different recording/reproduction methods and have different specifications in regard to the size or capacity of stored data, disk driving speed, recording density, and so on, as well as disk materials and prices. Consequently, drive motors of different specifications are used for driving different types of recording disks.

Nowadays, there is a trend towards a higher degree of sophistication and a greater size of electronic data, as image data are handled more than text data. This has given rise to the demand for inexpensive recording disks and disk drives which are capable of performing quick storage and reproduction of large volumes of information.

For instance, CDs were initially used as music recording/playback media but are nowadays applied for spreading use as CD-ROMs which are major storage disks for computers, by virtue of their advantages over other types of media. This type of storage media offers greater storage capacity and shorter operation time, i.e., reduced seek time, permitting much higher speed of rotation by means of high-speed disk drive motors, thus affording disk rotation speeds 20 times as high as that of music CDs.

Figure 1:
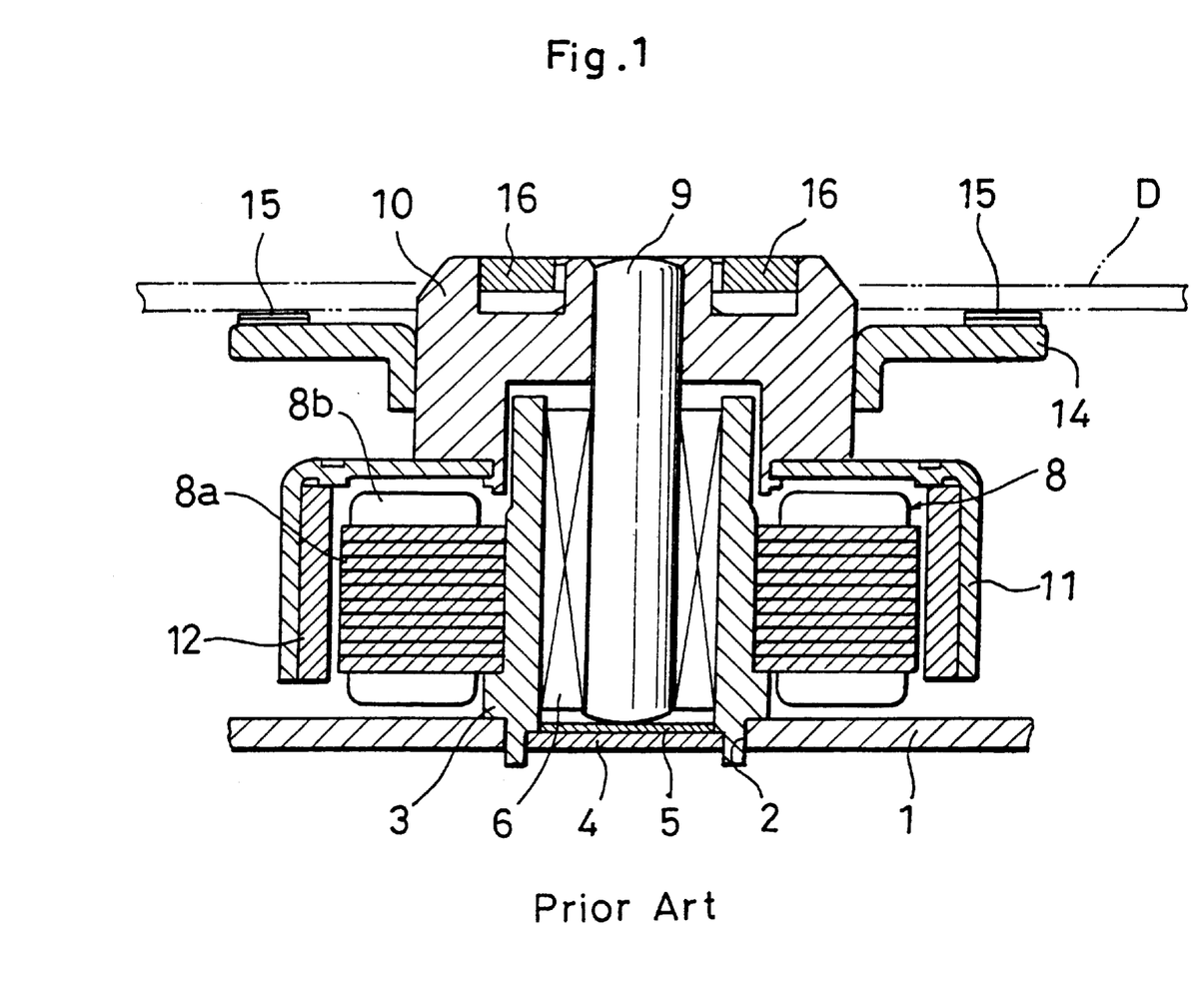
FIG. 1 is a cross-sectional view of a conventional disk drive motor.

FIG. 1 shows the construction of a conventional disk drive motor.

The conventional disk drive motor shown in FIG. 1 has a substantially cylindrical sleeve 3 which at its lower end fits in an opening 2 formed on a base member 1 as a part of a chassis of a disk drive device. The lower opening of the sleeve 3 is closed by a tabular member 4 which carries a thrust bearing member 5. A sleeve bearing 6 made of an oil-impregnated metal or a wear-resistant resin is received in the sleeve 3.

A stator 8 includes a stator core 8a which is secured to the outer surface of the sleeve 3 and stator coils 8b wound therearound. A shaft 9 is rotatably supported by the sleeve bearing 6 such that it is in contact at its lower end, with the thrust bearing member 5 while its upper end projects beyond the upper end of the sleeve 3. A rotor hub 10 made of non-magnetic material such as aluminum is fixed to the upper end of the shaft 9. A yoke 11 made of magnetic material such as iron is fixed to the rotor hub 10.

The yoke 11 has a disk-shaped base portion and a cylindrical skirt portion which is integrally formed with the base portion and extends downward from the radially outer end of the base portion. The sleeve 3 is received in a central opening formed at the center of the base portion of the yoke 11. The inner peripheral edge of the base portion defining the central opening is fixed to a lower end portion of the rotor hub 10. An annular rotor magnet 12 is fixed to the inner peripheral surface of the cylindrical skirt portion of the yoke 11, so as to radially face the stator 8.

A turntable 14 which is secured to the outer peripheral surface of the rotor hub 10 carries a recording disk D, through an intermediary buffer member 15. A clamp magnet 16 is provided in a recess formed on the top of the rotor hub 10, such that the upper surface of the clamp magnet 16 is flush with the top surface of the rotor hub 10. The clamp magnet 16 magnetically attracts a disk pressing means (not shown) on the disk drive unit, thereby fixing the recording disk D.

In operation, electrical current supplied to the coils 8b of the stator 8 serves to generate magnetic force which acts between the stator 8 and the rotor magnet 12 so as to induce a torque for rotation. As a consequence, the rotor magnet 12, the yoke 11, the rotor hub 10 and the shaft 9 rotate as a unit, relative to the stator 8 which is stationary, whereby the turntable 14 and, hence, the recording disk D thereon rotate in a predetermined direction.

When such a conventional motor is driven at high speed, there occurs a problem which is not serious when the conventional motor is driven at low speed. Namely, high speed driving of the motor makes is difficult to control and regulate motor performance such as run-out of the rotary part, vibration and noise of the motor. In particular, when the run-out of the rotary part increases, storage and reproduction of data become less reliable.

Run-out, vibration and noise are considered to be attributable to slight local dimensional errors which produce only negligibly small effect in low speed driving but shows serious effect on high speed driving as described above, resulting in imbalance of motor parts under rotation.

It is true that rotational performance of the conventional motor structure shown in FIG. 1 can be improved to some extent when, for example, the shaft 9 and the sleeve bearing 6 are machined, finished and mounted with higher degree of precision. This solution, however, is still unsatisfactory from the viewpoint of production costs.

Rotational performance is also affected by any dimensional error of the recording disk, particularly when the rotation speed is high. When production costs of disks are considered, however, it is difficult and impractical to achieve a higher dimensional precision of recording disks.

It is materially impossible to completely eliminate any dimensional error and mass imbalance of the rotary system including the motor and the disk. Under this circumstance, a demand exists for a measure which improves the rotational performance while allowing dimensional error and mass imbalance to some extent.

SUMMARY OF THE INVENTION

Accordingly, it is an object of the present invention to provide a disk drive motor of which impairment of rotational performance, in particular run-out of the rotary part of the motor, is suppressed at high speed operation of the motor.

Another object of the present invention is to provide a disk drive motor that offers high rotational performance while accommodating dimensional errors of the motor and disk.

It is still another object of the present invention to provide a disk drive motor which can be fabricated at reduced costs but yet is capable of operating with high rotational performance.

To attain those objects, a disk drive motor according to the present invention comprises a rotor having an annular space formed therein coaxially with the axis of rotation, and balancing members accommodated in the annular space and capable of changing its mass distribution circumferentially along the circle of the annular space.

When the motor speed is low, the balancing members assume random positions within the annular space. As the motor is driven at speed beyond a predetermined value, the balancing members distribute at equal spaces along the radially outer circumferential surface of the annular space, due to effect of centrifugal force. In case of any imbalance occurring during the rotation, the balancing members temporarily gather to a portion of the annular space where the mass imbalance is taking place. However, when the motor speed exceeds the value at which resonance takes place due to coincidence between the frequency of the vibration of the balancing members and the natural frequency of the motor, the balancing members move to a position symmetrical with the point of mass imbalance to eliminate the mass imbalance, thereby suppressing the run-out.

The drive motor may have means for urging the balancing members radially inward so as to prevent the random movement of the balancing members during low-speed operation of the motor. Such urging means effectively urges the balancing members towards the radially inner end of the annular space, thereby reducing vibration and noise which otherwise may be produced due to random movement of the balancing members within the annular space during low-speed operation of the motor.

The radially inward urging means may be constituted by a tapered bottom surface of the annular space inclined radially inward and downward, or by magnets arranged at the radially inner or outer end of the annular space so as to urge the balancing members made of a magnetic member radially inward by magnetic attracting or repellent force.

When such a magnetic urging means is used for urging the balancing members radially inward, the magnets may be held by yokes which form a gap along the surface of the magnets acting on the balancing members. The size of the gap is determined in accordance with the motor speed and the level of the centrifugal force, so as to optimize the force acting on the balancing members.

The above and other objects, features and advantages of the present invention will become clear from the following description of the preferred embodiments when the same is read in conjunction with the accompanying drawings.

BRIEF DESCRIPTION OF THE DRAWINGS

FIG. 8b is a fragmentary sectional view of a motor incorporating the embodiment shown in FIG. 8a;

DESCRIPTION OF THE PREFERRED EMBODIMENTS

A first embodiment of the present invention will be described with specific reference to FIG. 2.

Figure 2:
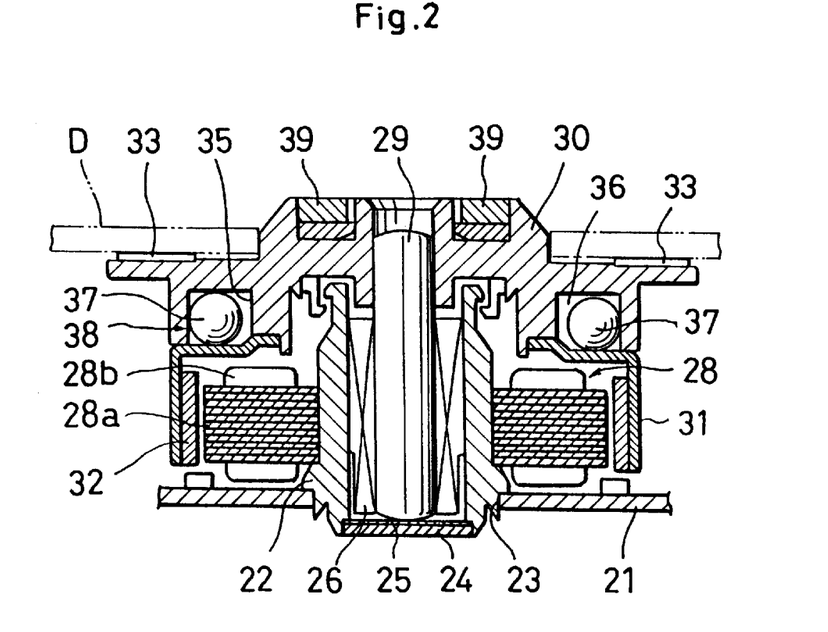
FIG. 2 is a cross-sectional view of a first embodiment of the disk drive motor in accordance with the present invention.

With reference to FIG. 2, a disk drive motor of the first embodiment has a stationary member 21 as a part of a chassis of disk driving device and a stationary cylindrical sleeve member 22 which is secured at its lower end to the brim of an opening 23 formed in the stationary member 21. A circular plate member 24 is fixedly secured to the bottom opening of the sleeve member 22 to close the opening. A thrust bearing member 25 is fixed to the upper surface of the circular plate member 24 so as to be positioned at the bottom of the sleeve member 22. And a sleeve bearing 26 which made of an oil-impregnated metal or a wear-resistant resin, is secured to the inner peripheral surface of the sleeve member 22.

The disk drive motor further has a stator 28 which includes a stator core 28a fixed to the outer surface of the sleeve member 22 and coils 28b wound around the stator core 28a, and a shaft 29. The lower end of the shaft 29 is held in contact with the thrust bearing member 25 and the upper end of the shaft 29 projects beyond the upper end of the sleeve member 22. The shaft 29 serves as a part of rotor and is rotatably supported by the sleeve bearing 26. A turntable 30 made of a non-magnetic material such as aluminum is attached to the upper end of the shaft 29 and also serves as a part of the rotor.

A yoke 31 is made of magnetic material such as iron and has a disk-shaped base portion and a cylindrical skirt portion integrally formed with the base portion and extending downward from the radially outer end thereof. The sleeve 22 is positioned within an opening formed at the central portion of the base portion of the yoke 31. The inner peripheral edge of the base portion defining the opening is secured to a lower end portion of the turntable 30. A rotor magnet 32 is fixedly secured to the inner peripheral surface of the cylindrical skirt portion of the yoke 31 so as to oppose the stator 28. A recording disk D such as a CD-ROM is mounted on the upper surface of the turntable 30 through an intermediary buffer member 33.

The turntable 30 is formed with an annular recess 35 on its bottom. The lower opening of the annular recess 35 is closed by the upper surface of the base portion of the yoke 31, whereby a closed annular space 36 is formed. The annular space 36 accommodates a plurality of balls 37 made of steel. The annular space 36 and the balls 37 accommodated therein constitutes a balancer 38 which serves to correct any mass imbalance of the rotor. The annular space 36 is formed coaxially with the shaft 29. The radial width of the annular space 36 is determined to be slightly greater than the diameter of the balls 37, so that the balls 37 are allowed to move in the circumferential direction along the walls of the annular space 36.

The embodiment shown in FIG. 2 employs nine (9) balls 37. The sum of the diameters of these nine balls 37 is not greater than about one eighth (⅛) of the outer circumferential length of the annular space 36. The rest of the annular space 36, amounting to about seven eighth (⅞) or more of the outer circumference provides the clearance for the movement of the balls 37.

Referring further to FIG. 2, a clamp magnet 39 is provided within a recess formed on the top of the turntable 30 such that the upper surface of the clamp magnet 39 is substantially flush with the top surface of the turntable 30. The clamp magnet 39 is adapted to magnetically attract disk pressing means (not shown) provided on the disk driving device, thereby stably fixing the recording disk D.

When current is supplied to the coils 28b of the stator 28, a magnetic force which acts between the stator 28 and the rotor magnet 32 is induced. As a result, the rotor magnet 32, the yoke 31, the turntable 30 and the shaft 29 rotate relative to the stator 28 which is kept stationary, whereby the disk D is rotated in a predetermined direction.

In the following, explanation will be made about the operation of the balancer 38 when the recording disk D such as a CD-ROM is driven by the motor of this embodiment.

When the rotor of the motor rotates imbalancedly, for example, the rotor rotates in a condition inclined to imbalanced direction. After the motor starts to rotate, the balls 37 move in a random manner within the annular space 36 until the motor speed exceeds a resonance speed at which resonance takes place due to coincidence between the natural frequency of the motor and the natural frequency of each ball 37. More specifically, in this period, the balls 37 are distributed to random positions around the axially lowermost portion of the annular space 36 by the gravity. Consequently, the rotor rotates in an unstable manner, with the axis of rotation of the rotor being deflecting from the axis of the shaft 29, as a result of momentary shift of the masses due to the random movement of the ball 37.

At the rated speed above the resonance speed, a 180 degree (180°) of phase difference appears between the centrifugal force generated by the mass imbalance and the displacement of the balls 37, and the balls 37 are moved in such directions to cancel the mass imbalance and a counter-centrifugal or automatic centering effect is produced. Thus, the balls 37 are concentrated to a position that is symmetrical with the position of the initial mass imbalance of the motor with respect to the axis of rotation, so as to cancel the mass imbalance. In this state, the rotary part of the motor can stably rotate about an axis that coincides with the axis of the shaft 29.

On the other hand, when the rotor rotates balancedly, in this case also, the rotation of the rotor is rendered unstable due to momentary shift of the masses caused by random movement of the balls 37, until the motor speed exceeds the resonance speed at which resonance takes place due to coincidence between the natural frequency of the motor and the natural frequency of the balls 37. In this case, however, the balls 37 are moved to three positions that are spaced at 120 degree (120°) from one another, such that three balls 37 are concentrated to each of these three positions, at the rated speed above the resonance speed. Thus, the balls 37 behave not to impair the original mass balance by themselves.

As will be understood from the foregoing description of the first embodiment of the present invention, the balls 37 in the annular space 36 move to automatically cancel any mass imbalance of the rotor during operation at the rated speed. Thus, any mass imbalance is automatically corrected, so that the run-out of the rotor can effectively be avoided without requiring extremely high degree of dimensional precision of the motor parts. It is also to be appreciated that the rotor together with the recording disk D can stably rotate despite any dimensional error, regardless of whether such dimensional error exists in the rotor or in the disk D. In addition, when there is no mass imbalance in the rotary system composed of the rotor and the disk D, the balls 37 behave so as not to impair this balance.

Although the balls 37 made of a steel are used in this embodiment, the balls 37 may be made of other materials such as ceramics, rubber, plastics or the like equally as well. The balls 37 inevitably collide with one another and with the walls of the annular space 36 during the random movement. In order to suppress generation of noise attributable to the collision, it is advisable to use the balls 37 made of soft material. For instance, generation of noise can appreciably be suppressed when the balls 37 are made of composite material composed of a steel core ball clad with a resin coating or of a rubber which itself is a soft material.

The balls 37 of any of the above-mentioned material can smoothly move within the annular space 36 so as to quickly correct any mass imbalance. In particular, noises due to collision and friction during random movement of the balls 37 can effectively be suppressed when the surfaces of the balls 37 are coated with soft material such as soft resin. Such coating is also effective in protecting the balls 37 from damages and rusting. The coating further offers advantages such as quietness, cleanness and durability of the motor.

In the described embodiment, the annular space 36 is defined between the lower surface of the turntable 30 and the upper surface of the base portion of the yoke 31. This arrangement enables the balls 37 as the balancing member to be disposed in a neat and compact manner, without affecting structures of major motor parts such as the rotor magnet 32 and the stator 8. In addition, this arrangement serves to facilitate the balancing because the position of the annular space 36, between the lower surface of the turntable 30 and the upper surface of the yoke 31, is close to the center of gravity of the rotary member including the rotor and the disk D.

The above described first embodiment employs nine (9) balls 37 which are sized such that the sum of the diameters of these nine (9) balls 37 amounts to a value which is not greater than about one eighth (⅛) of the outer circumferential length of the annular space 36. This also is only illustrative and the number, size and specific gravity of the balls 37 to be accommodated in the annular space 36 may be suitably selected depending on factors such as expected degree of mass imbalance.

It is to be understood, however, a single ball cannot provide the advantage of the invention. In order to deal with a variety of forms of mass imbalance, it is necessary to employ at least two balls. Experiments showed that appreciable effect is obtained when the number of the balls 37 employed is an integer multiple of 3, e.g., 6 or 9. This is attributable to the fact that the balls 37 are equally distributed to three positions spaced at 120 degree (120°) from one another, offering a greater degree of stability as compared with the case where the balls 37 are equally distributed to two or four positions.

It is also necessary that the sum of diameters of the balls 37 accommodated in the annular space 36 does not exceed half the outer circumferential length of the annular space 36, for otherwise a ball or balls out of the half circumference of the annular space 36 act to impair the rotational mass imbalance.

A second embodiment of the present invention will be described with reference to FIG. 3. In this Figure, the same reference numerals as those used in FIG. 1 are employed to denote parts or components of the second embodiment which are the same or equivalent to those of the first embodiment. Detail of such same or equivalent parts is not made for the purpose of clarification.

In the second embodiment, the radial width of the annular space, denoted by numeral 42, is large in comparison with the diameter of the balls 37. More specifically, the radial width of the annular space 42 is about twice as large the diameter of the balls 37, so that the balls 37 are movable not only in the circumferential direction but also in the radial direction within the annular space 42.

In this embodiment, the disk-shaped base portion of the yoke 31, presenting the bottom surface of the annular space 42, has a radially outer end portion which is curved upward to ascend towards the radial end extremity and a radially inner end region which is curved downward to descend towards the center. Consequently, the axial height of the annular space 42 varies along the radius so as to progressively decrease towards the radial end extremity. With this arrangement, the balls 37 stagnate in the radially innermost region, i.e., in the axially lowest region of the annular space 42, when the drive motor is not operating.

Due to a reason pertaining to the operation principle for recording and reading data to and from a CD-ROM, it is a common measure to vary the rotation speed of the disk depending on the radial position of the tracking. Namely, the rotation speed during tracking on a radially outer track is different from that during tracking on a radially inner track. In the second embodiment, correction of imbalance can be performed momentarily in response to the change of the rotation speed within the rated speed range. This owes to the fact that the annular space 42 has the radial width which is sufficiently greater than the diameter of the balls 37 allowing the balls 37 to momentarily change their radial position.

Figure 3:
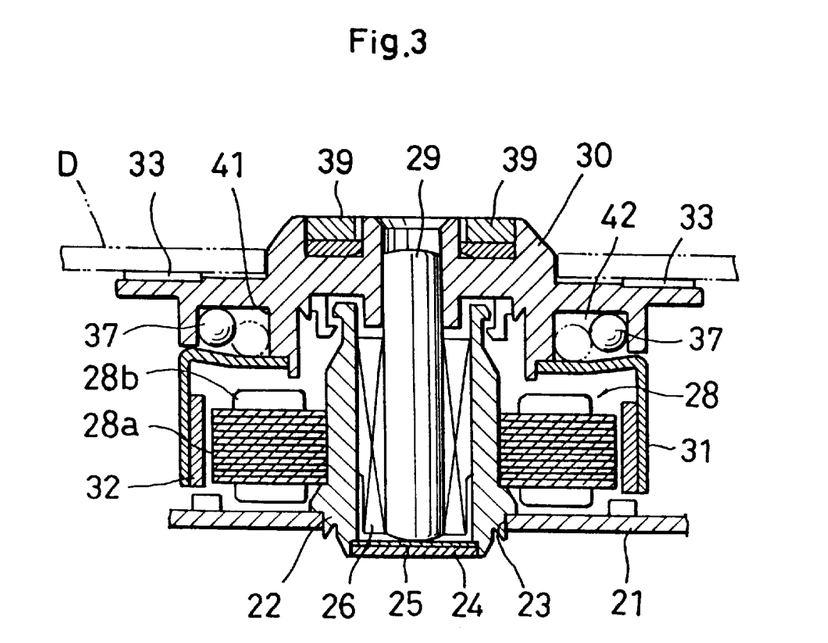
FIG. 3 is a cross-sectional view of a second embodiment of the disk drive motor in accordance with the present invention.

The operation of the motor of the second embodiment shown in FIG. 3 is similar to that of the first embodiment shown in FIG. 2, before the motor speed reaches the resonance speed at which resonance takes place due to coincidence between the natural frequency of the motor inclusive of the recording disk D mounted thereon and the natural frequency of the balls 37. Namely, the balls 37 move in a random manner along the inner periphery of the annular space 42, before the above-mentioned resonance speed is reached.

During operation at a speed falling within the rated speed range above the resonance speed, the balls 37 are moved and concentrated to a region which is in symmetry with the imbalance mass with respect to the axis of rotation, whereby the mass imbalance is canceled to allow the rotor to stably rotate about the axis which coincides with the axis of the shaft 29. A variation of the motor speed within the rated speed range causes a corresponding change in the centrifugal force acting on each ball 37. In this embodiment, since the annular space 42 is designed to allow the balls 37 to move not only in the circumferential direction but also in the radial direction, the balls move to radial positions corresponding to the rotation speed, so as to maintain stable rotation of the rotor.

Thus, in the second embodiment, the annular space 42 has an ample radial width for the diameter of the balls 37 so as to allow the balls 37 to move not only in the circumferential direction but also in the radial direction. Therefore, even when the rotation speed is changed within the rated speed range, stable rotation is ensured by virtue of the movement of the balls 37 to a radial position corresponding to the rotation speed.

The base portion of the yoke 31, which closes the lower opening of the annular recess 41 so as to act as the bottom wall of the annular space 42, is tapered such that the radially outer end portion is curved upward while the radially inner end portion is inclined downward towards the axis of rotation. Consequently, a composite force composed of the force of gravity and a reacting force perpendicular to the plane of the bottom surface of the annular space 42 is generated so as to urge the ball 37 radially inward, i.e., towards the axis of rotation. When the motor is not operating, the balls 37 rest at the radially innermost region of the annular space 42. However, when the motor is operating, the force acting on each ball 37 is determined by subtracting from the above-mentioned inward urging force and the centrifugal force proportional to the rotation speed. Thus, the balls 37 are held at a radial position where a balance is obtained between the radially inward urging force provided by the tapered bottom surface of the annular space 42 and the radially outward centrifugal force. It is thus possible to control the radial position of the balls 37 based on the relationship between the radially inward urging force and the centrifugal force. This means that the radial positions at which the balls 37 are held can be set as desired, such that, for example, the balls 37 are held at a radially inner position when the rotation speed is below the resonance speed and at a radially outer position when the rotation speed is not lower than the resonance speed, by suitably determining the gradient of the taper of the bottom surface of the annular space 42 as a design parameter, in addition to the factors such as the diameter and number of the balls 37 and the motor speed. Obviously, the balls 37 are held at the radially innermost region of the annular space 42 when the motor is not operating, because no centrifugal force acts on the balls 37. Therefore, the motor can be started always at the same state of balance.

Figure 4:
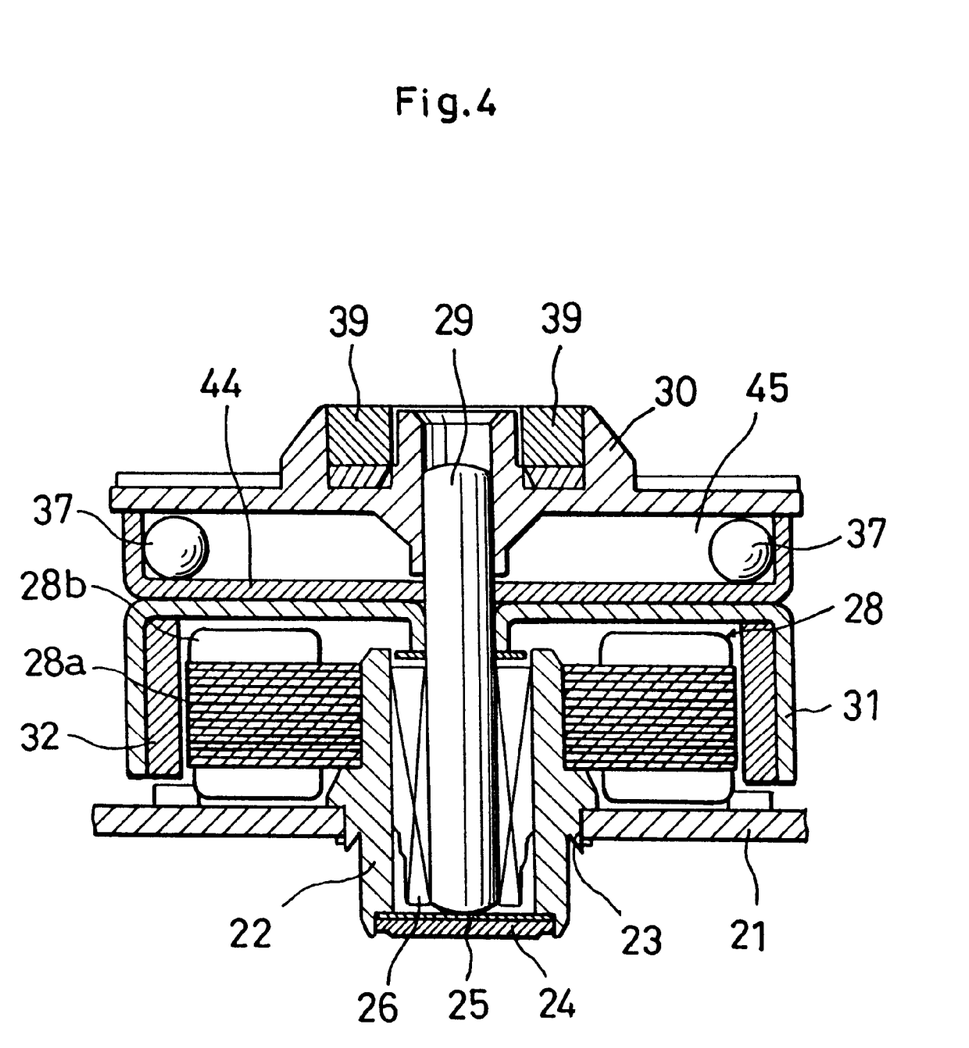
FIG. 4 is a cross-sectional view of a third embodiment of the disk drive motor in accordance with the present invention.

A description will now be given of a third embodiment of the present invention, with specific reference to FIG. 4.

In this embodiment, the turntable 30 has a flat lower surface and the yoke 31 is secured to the shaft 29. A basin-shaped member 44 having a disk-shaped base portion with upwardly curved outer peripheral portion is disposed between the lower surface of the turntable 30 and the upper surface of the base portion of the yoke 31 and is fixed to the shaft 29. The upper end of the basin-shaped member 44 is held in contact with the lower surface of the turntable 30, whereby a closed annular space 45 is formed.

Since the annular space 45 is provided by the basin-shaped member 44 held in contact at its upper end with the lower surface of the turntable 30, the radial span of the annular space 45 is further increased over that in the motor of the second embodiment shown in FIG. 2. Thus, the balls 37 are allowed to travel a sufficiently large radial distance which is determined by subtracting the radius of the shaft 29 from the radius of the motor.

The greater amount of radial movement of the balls 37 afforded in this embodiment offers a correspondingly greater adaptability to variation of the motor speed. In addition, the drive motor of this embodiment can be fabricated without difficulty, because the annular space 45 is formed by the basin-shaped member 44, without requiring any specific machining on the lower surface of the turntable 30.

The annular space 45 having an ample radial span equivalent to that provided by the basin-shaped member 44 in this embodiment can also be formed by a suitable combination of the turntable 30 and the yoke 31 as in the cases of the first and second embodiments. It is also to be understood that the annular space 45 in the third embodiment may have a bottom surface tapered downward towards the axis of rotation, as in the second embodiment shown in FIG. 3.

A description will now be given of a fourth embodiment and a fifth embodiment of the disk drive motor in accordance with the present invention, with reference to FIGS. 5, 6a and 6b.

Figure 5:
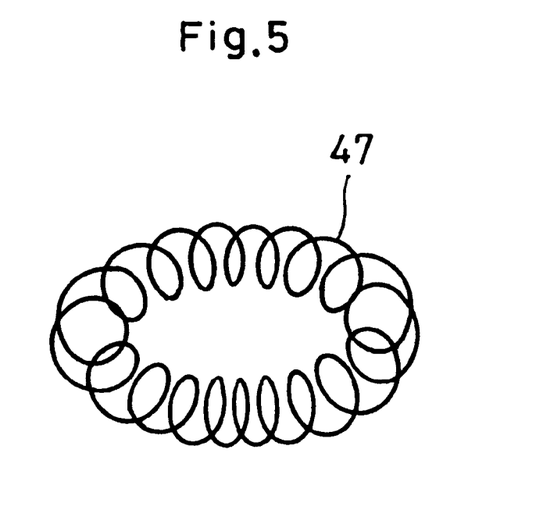
FIG. 5 is a perspective view of a coiled spring used in a fourth embodiment of the disk drive motor in accordance with the present invention.

Referring first to FIG. 5, a disk drive motor as the fourth embodiment of the present invention employs a ring-shaped coiled spring 47. This coiled spring 47 has a small spring constant, and serves as the balancing member, in place of the discrete balls 37 used as the balancing member in the first to third embodiments. Thus, the ring-shaped coiled spring 47 may be accommodated in the annular space 39, 42 or 45 of any of the preceding embodiments, so as to extend in the ring-like form along the inner circumferential surface of the annular space 39, 42 or 45.

Figure 6A:
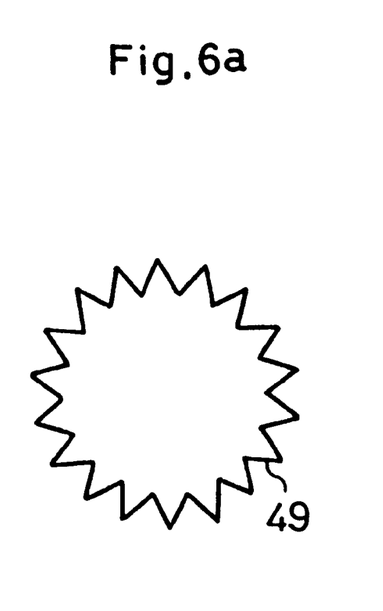
FIG. 6a is a plan view of a leaf spring used in a fifth embodiment of the disk drive motor in accordance with the present invention.
Figure 6B:
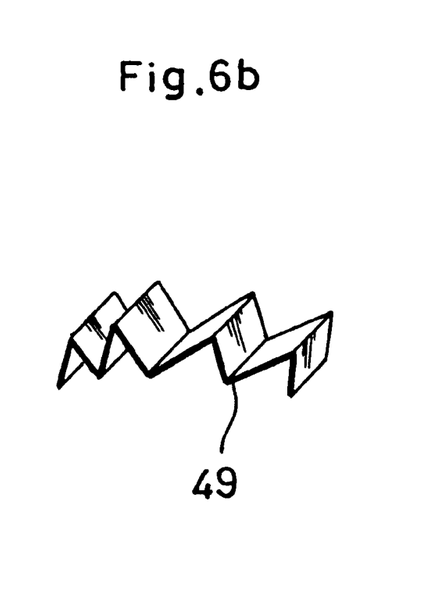
FIG. 6b is a perspective view of the leaf spring shown in FIG. 6A.

Referring now to FIGS. 6a and 6b, a disk drive motor as the fifth embodiment incorporates a ring-shaped leaf spring 49 which serves as the balancing member in place of the discrete balls 37 of the first to third embodiments and the coiled spring 47 used in the fourth embodiment. The ring-shaped leaf spring 49 also may be accommodated in the annular space 39, 42 or 45 of any of the preceding embodiments, so as to extend in the ring-like form along the inner circumferential surface of the annular space 39, 42 or 45.

In operation, the ring-shaped coiled spring 47 or the ring-shaped leaf spring 49 is deflected in such a manner that a dense portion of the spring is formed locally in the region that is symmetrical with the mass unbalance with respect to the axis of rotation. Therefore, mass is increased locally in that region, thereby canceling any mass unbalance.

The fourth and fifth embodiments as described above are free from the problem of noise such as the chattering noise which is inevitable in the first to third embodiments incorporating freely movable the balls 37, thus offering disk drive motors which operate with reduced noise. In addition, the disk drive motors of the fourth and fifth embodiments are easy to assemble, by virtue of the reduced number of parts.

The ring-shaped leaf spring 49 used in the fifth embodiment is heavier than the coiled spring 47 used in the fourth embodiment. The fifth embodiment is therefore suitable for use in the case where the balancing member is required to have a large mass.

The balancing member may also be implemented by using, for example, a magnetic fluid, oil, mercury, a gel or particles such as sand. When a magnetic fluid is used as the movable balancing mass, it is advisable to dispose a magnet as a leak prevention means at a suitable position such as a position near the fluid filing opening or near the gap. It is also advisable to apply an oil-repellent material as the leak prevention means, when oil is used as the balancing mass.

A sixth embodiment of the present invention will be described with reference to FIG. 7.

Figure 7:
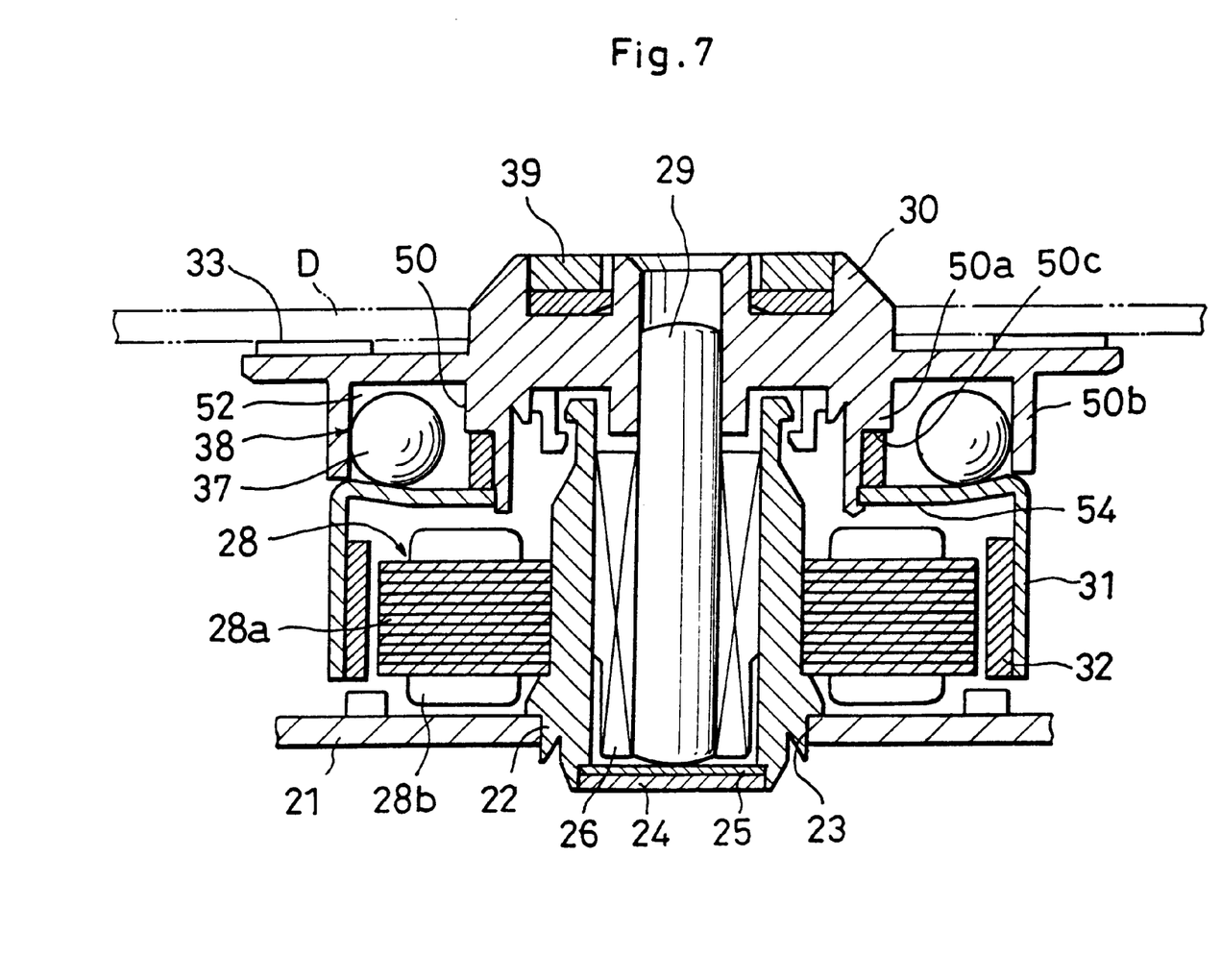
FIG. 7 is a cross-sectional view of a sixth embodiment of the disk drive motor in accordance with the present invention.

It will be seen from FIG. 7 that the annular space denoted by numeral 52 has a radial width slightly greater than the diameter of the balls 37.

In this embodiment, the disk-shaped base portion of the yoke 31 presents the bottom surface of the annular space 52 and has a radially outer end portion which is curved upward to ascend towards the radial end extremity and a radially inner end region which is curved downward to descend towards the center. Consequently, the axial height of the annular space 52 varies along the radius so as to progressively decrease towards the radial end extremity. With this arrangement, the balls 37 stagnate in the radially innermost region, i.e., in the axially lowest region of the annular space 52, when the drive motor is not operating.

An inner wall 50a of the annular recess 50 defining the annular space 52 is partly removed to provide a circumferential groove 50c. An annular magnet 54 is received in the circumferential groove 50c, so as not to project outward beyond the surface of the inner wall 50a. Since the outer surface of the annular magnet 54 is recessed from the surface of the inner wall 50a, the balls 37 are not allowed to directly contact with the annular magnet 54, even when the balls 37 are moved radially inward into contact with the inner wall 50a. The annular magnet 54 is therefore protected from damaging force which otherwise may be applied thereto due to direct contact with the balls 37. The annular magnet 54 may be pre-fabricated and fixed by an adhesive or the like in the circumferential groove 50c, or may be integrally molded with the inner wall 50a.

The operation of the disk drive motor shown in FIG. 7 in the case of an imbalance of the rotary mass is as follows. The motor together with the recording disk mounted thereon starts to rotate and accelerates. In the transient period before the aforesaid resonance speed is exceeded, the balls 37 are held in contact with the inner wall 50a of the annular space 52 by an inward concentric force and are allowed to move only in circumferential directions. In this case, the inward urging force is the sum of the magnetic attracting force exerted by the annular magnet 54 and the radially inward urging force produced as a result of the inward and downward inclination of the base portion of the yoke 31. In this transient period, therefore, the balls 37 move in a random manner along the inner peripheral region of the annular space 52. Consequently, the rotor together with the disk D rotates in unstable manner with the axis of rotation of the rotor being deflecting from the axis of the shaft 29, as in the case of the motor shown in FIG. 2.

When the motor is operating at a speed falling within the rated speed range above the resonance speed, the centrifugal force acting on the ball 37 overcomes the inward concentric force. Therefore, the balls 37 move radially outward apart from the inner wall 50a of the annular space 52 so as to be concentrated to a region which is in symmetry with the position of mass imbalance with respect to the axis of rotation. Consequently, the mass imbalance is canceled and the motor can operate stably and smoothly with the axis of rotation maintained in alignment with the axis of the shaft 29.

If no inward concentric force acts on the balls 37, the balls 37 will start to move to the radially outermost region of the annular space 52 immediately after the start up of the motor, resulting in a tremendously imbalanced rotation. In this embodiment, however, the balls 37 do not move apart from the inner wall 50a of the annular space 52 when the rotation speed is still below the rated speed range, because the inward concentric force is imposed on the balls 37 such that the balls 37 start to leave the radially innermost region of the annular space 52 only after the motor reaches a speed near the rated speed range. In addition, since the balls 37 are restrained from moving radially outward within the annular space 52 when the motor is not operating, it is possible to prevent generation of noise which otherwise would occur due to collision of the balls 37 with, for example, the walls of the annular space 52 during movement or portage of the drive unit.

A seventh embodiment of the present invention will be described with reference to FIGS. 8a and 8b.

Figure 8A:
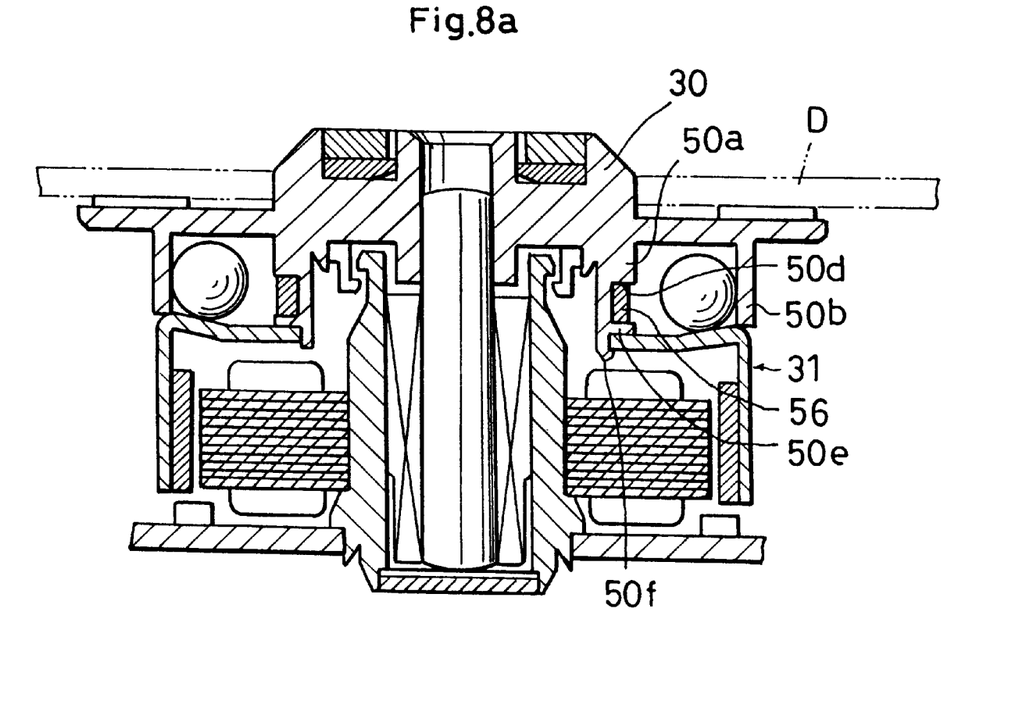
FIG. 8a is a cross-sectional view of a seventh embodiment of the disk drive motor in accordance with the present invention.

As shown in FIG. 8a, the radially outer surface of the inner wall 50a of the annular space 52 is partially removed at its heightwise central portion, so as to provide a circumferential groove 50d which opens radially outward. An annular magnet 56 is received in this circumferential groove and. A lower wall 50e is formed on the radially outer surface of the inner wall 50a so as to extend radially outward therefrom. The lower wall 50e defines the lower end of the circumferential groove 50d and is positioned between the lower end portion of the annular magnet 56 and the base portion of the yoke 31.

The lower wall 50e offers the following advantage. In the assembly of the disk drive motor of this embodiment, the yoke 31 is fixed by caulking to the inner wall 50a of the annular space 52 so as to be integral with the turntable 30, as at 50f. The stress generated as a result of the caulking is borne by the lower wall 50e which acts as a buffer member, without directly acting on the annular magnet 56. It is thus possible to protect the annular magnet 56 from damaging force and, therefore, to reduce the risk of production of inferior products.

Figure 8B:
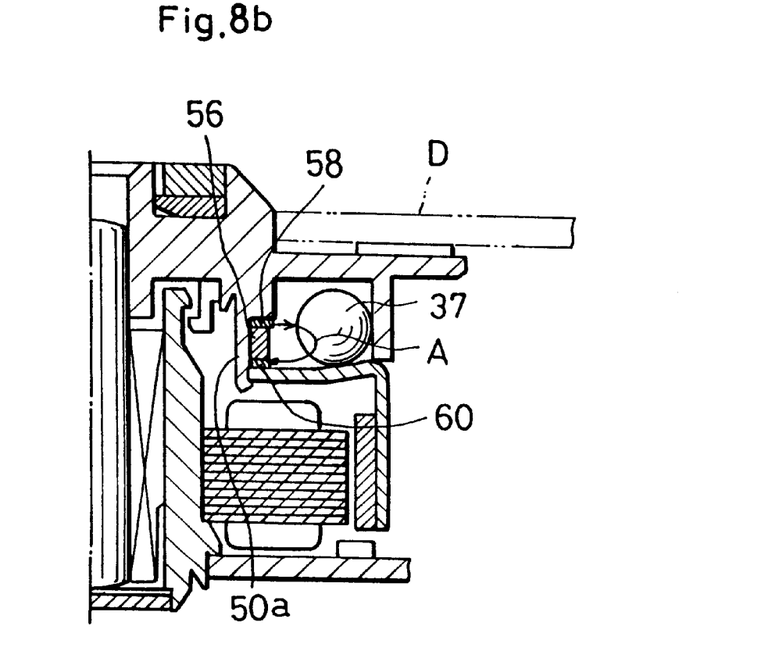

FIG. 8b shows a modification of the disk drive motor of the seventh embodiment. In this modification, thin-walled magnetic rings 58 and 60 are disposed on both axial ends, i.e., upper and lower ends shown in the FIG. 7, of the annular magnet 56. Thus, the magnetic rings 58 and 60, with the annular magnet 56 sandwiched therebetween, are disposed on the radially outer side of the inner wall 50a. The outside diameters of the magnetic rings 58 and 60 are greater than that of the annular magnet 56, so that these magnetic rings 58 and 60 serve to prevent the balls 37 from directly contacting with the annular magnet 56. Thus, the magnetic rings 58 and 60 provide a buffering function that protects the annular magnet 56 from damaging force. At the same time, magnetic circuits are formed through the magnetic rings 58 and 60 as indicated by an arrow "A", with the result that the magnetic fluxes from the annular magnet 56 are concentrated to effectively and appropriately attract the balls 37.

Figure 9:
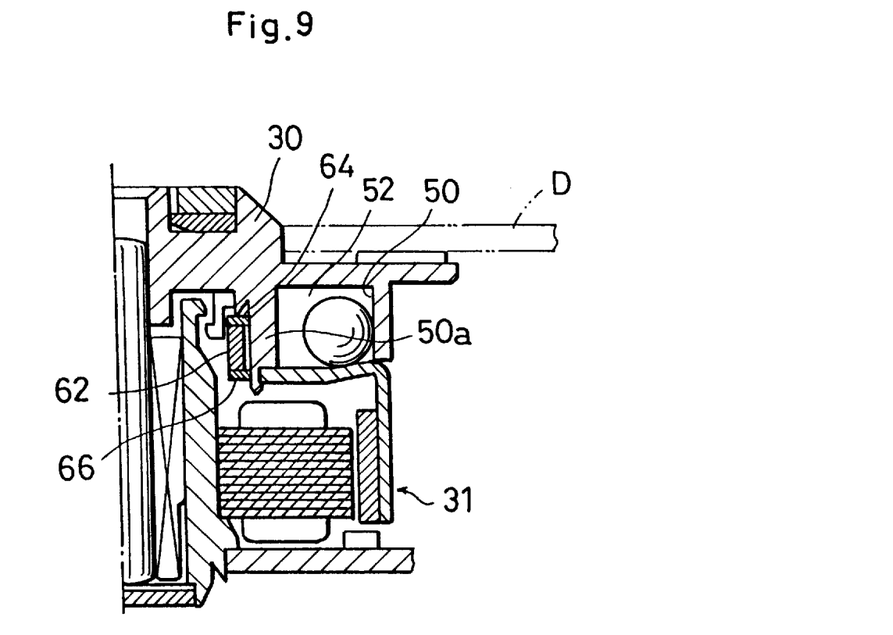
FIG. 9 is a fragmentary sectional view of an eighth embodiment of the disk drive motor in accordance with the present invention.

A explanation will now be given of the eighth embodiment of the present invention, with specific reference to FIG. 9.

An annular magnet 62, which is sandwiched between upper and lower magnetic rings 64 and 66, is disposed on the radially inner side of the inner wall 50a of the annular space 52. More specifically, the outer peripheral edges of the magnetic rings 64 and 66 are lightly pressed into a recess formed in the inner peripheral surface of the inner wall 50a, whereby the annular magnet 62 is secured to the inner wall 50a.

In this embodiment, therefore, the annular magnet 62 is not positioned within the annular space 52. Consequently, no direct contact or collision occurs between the balls 37 and the annular magnet 62, so that the annular magnet 62 is protected against damaging force which otherwise would be caused by direct contact or collision. In addition, the assembly can be facilitated because of the simplified structure of the annular space 52.

Figure 10:
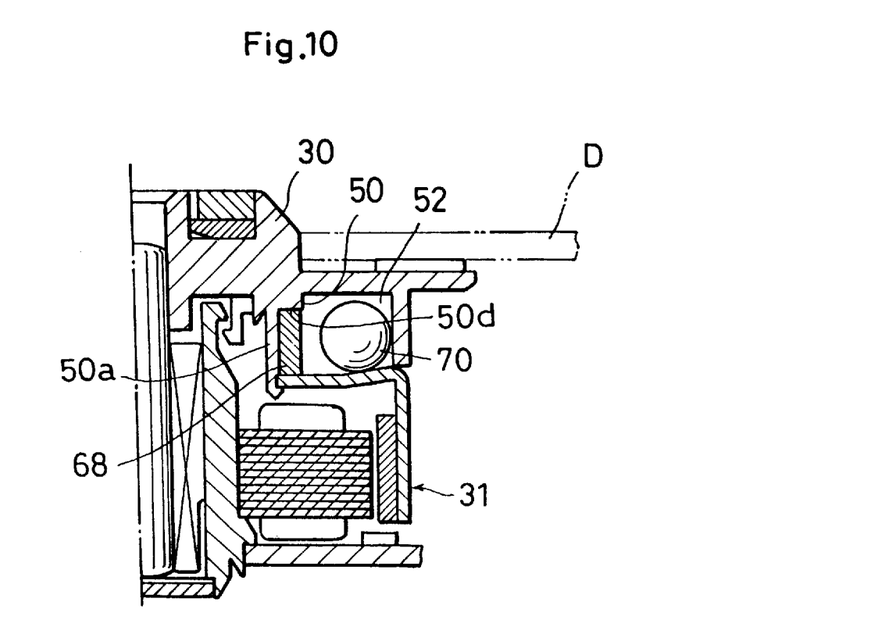
FIG. 10 is a fragmentary sectional view of a ninth embodiment of the disk drive motor in accordance with the present invention.

A ninth embodiment of the present invention will be described with reference to FIG. 10

This embodiments employs a magnetic ring 68 made of iron and received in a circumferential groove 50d formed in the radially outer surface of the radially inner wall defining the annular space 52. The balls 70 are made of magnets.

Inward concentric force acts on the balls 70 to urge these balls 70 towards the axis of rotation. In this case, the inward concentric force is the sum of the magnetic attracting force acting between the balls 70 and the magnetic ring 68 and the force generated due to downward and inward inclination of the base portion of the yoke 31. In this embodiment, the magnetic ring 68 can be formed from a comparatively hard material such as iron and, therefore, is less liable to be broken by a stress that is produced when the yoke 31 is caulked to the turntable 30.

A tenth embodiment will be described with reference to FIG. 11.

In this embodiment, the inner circumferential surface 72a of the annular recess 72 defining the annular space 36 has been partly removed to provide a circumferential groove 72c. An axially magnetized annular magnet 74 is received in the annular groove 72c. Supporting yokes 76 that are made of a magnetic material such as iron are disposed on both axial ends, i.e., upper and lower ends shown in the FIG. 11, of the annular magnet 74. Each of the yokes 76 has an annular portion 76a and an axial portion 76b formed by bending the radially outer end of the annular portion 76 at a right angle thereto so as to extend along the outer peripheral surface of the annular magnet 74. Thus, the annular magnet 74 is embraced by the pair of holding yokes 76.

Figure 11:
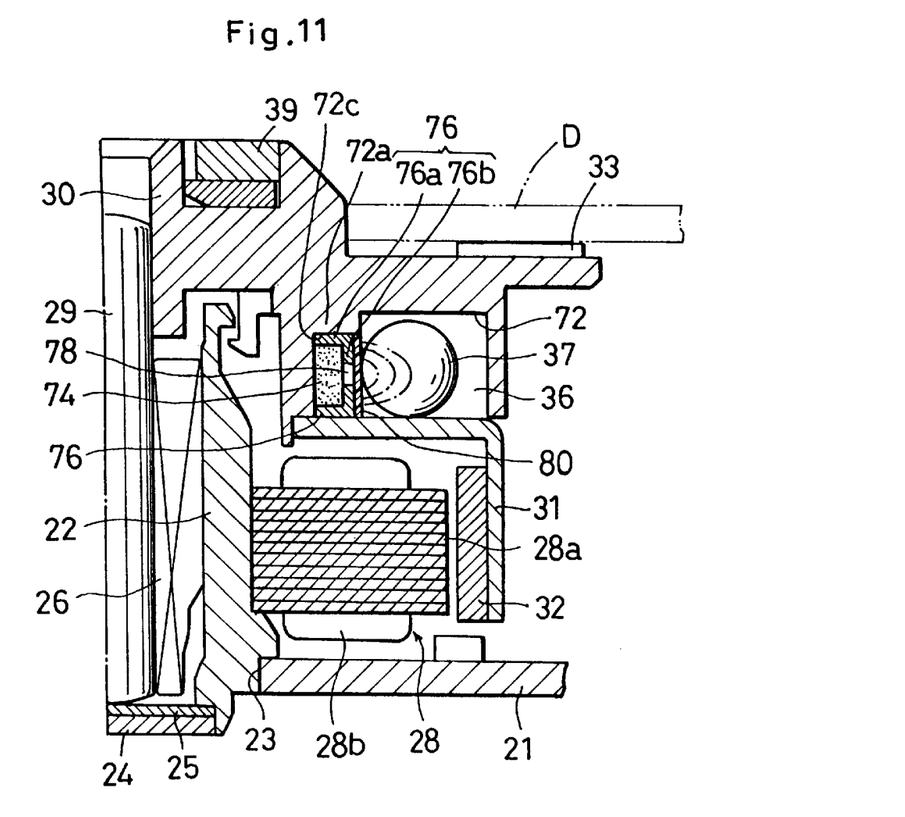
FIG. 11 is a fragmentary sectional view of a tenth embodiment of the disk drive motor in accordance with the present invention.

Referring to FIG. 11, numeral 78 denotes a gap formed between opposing axial portions 76b of the supporting yokes 76. The gap extends circumferentially along the outer peripheral surface of the annular magnet 74. Numeral 80 denotes a cylindrical spacer which is made of non-magnetic material, typically rubber or plastics, and which is disposed on the radially outer side of the axial portions 76b of both holding yokes 76.

Magnetic fields from the annular magnet 74 for attracting the balls 37 are formed through the holding yokes 76. The density of the magnetic fluxes is controllable by varying the size of the gap 78 in the direction of magnetization of the annular magnet 74. The level of the magnetic attracting force has been determined such that a balance is obtained between the magnetic attracting force and the centrifugal force acting on the balls 37 when the motor is operating at a predetermined speed of rotation which is slightly higher than the critical speed of the drive unit incorporating the motor but is below the rated speed.

Thus, in the tenth embodiment of the preset invention, the magnetic attracting force exerted on the balls 37 by the annular magnet 74 can be controlled by suitably selecting the size of the gap 78 between the opposing axial portions 76b of both holding yokes 76. The tenth embodiment, therefore, permits a common use of the same annular magnet 74 in a variety of motors to be incorporated in disk drive units having different critical speeds, thus offering a great advantage from the view point of production costs.

Figure 12:
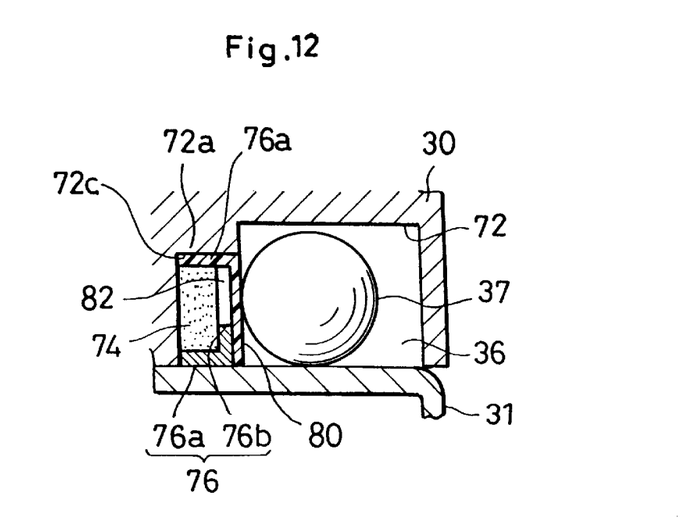
FIG. 12 is an enlarged view of a critical portion of an eleventh embodiment of the disk drive motor in accordance with the present invention.

FIG. 12 shows a modification in which only one of the pair of holding yokes 76 is provided with the axial portion 76b. In this modification, the axial length of the sole axial portion 76b is suitably selected to optimize the size of the gap denoted by 82.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A disk drive motor comprising:

a shaft;

a disk-shaped rotor fixed on one end portion of the shaft and having an annular projection surrounding the shaft, the rotor having an annular groove on the bottom of the annular projection;

a base plate having a cylindrical sleeve member;

a bearing means located in the sleeve member and interposed between the shaft and the sleeve member for supporting the shaft;

a yoke including a plate portion having a central opening and a circular depending portion depending from radially outward portion of the plate portion, the yoke being fixed to the annular projection of the rotor at the inner edge of the central opening so as to be in contact with the upper surface of the plate portion and the lower surface of the rotor to close the opening of the annular groove and form a closed annular space;

a rotor magnet secured on the inner peripheral surface of the circular depending portion of the yoke;

a stator disposed on the base plate so as to oppose the rotor magnet; and a balancing member movably located in the annular space and affected by a magnetic force generated by an annular magnet disposed in the vicinity of the annular groove toward the radially inward direction.

2. A disk drive motor according to claim 1, wherein the balancing member is a plurality of balls made of magnetic material.

3. A disk drive motor according to claim 1, wherein the annular magnet is provided on a radially inside portion of the annular groove for attracting the balancing member toward the radially inward direction.

4. A disk drive motor according to claim 1, wherein a cushioning member interposes between the annular magnet and the plate portion for preventing the annular magnet from being in contact with the balancing member.

5. A disk drive motor according to claim 4, wherein the cushioning member is a pair of magnetic pieces disposed on the axially upper and the lower portions of the annular magnet.

6. A disk drive motor according to claim 1, wherein the balancing member is made of magnetic material and is affecting a magnetic repulsion against the annular magnet.

7. A disk drive motor comprising:

a shaft;

a disk-shaped rotor fixed on one end of the shaft and having an annular projection surrounding the shaft, the rotor having an annular groove on the bottom of the annular projection;

a base plate having a cylindrical sleeve member;

a bearing means located in the sleeve member and interposed between the shaft and the sleeve member for supporting the shaft;

a yoke including a plate portion having a central opening and a circular depending portion depending from radially outward portion of the plate portion, the yoke being fixed to the annular projection of the rotor at the inner edge of the central opening so as to be in contact with the upper surface of the plate portion and the lower surface of the rotor to close the opening of the annular groove and to form a closed annular space;

a rotor magnet secured on the inner peripheral surface of the circular depending portion of the yoke;

a stator disposed on the base plate so as to oppose the rotor magnet;

a balancing member is movably located in the annular space; and an annular magnet provided on the inside of the annular groove and a pair of magnetic pieces disposed on the axially upper and lower portion of the annular magnet so as to form a circular gap on the outer peripheral surface of the annular magnet therebetween.

8. A disk drive motor according to claim 7, wherein the magnetic pieces include a pair of circular portions disposed on an upper and a lower end portions of the annular magnet and a depending portion depending from the one of the circular portion for covering a part of the outer peripheral surface of the annular magnet, the circular gap is formed between the one end portion of the depending portion and the one of the circular portion.

9. A disk drive motor according to claim 7, wherein the magnetic pieces include a pair of circular portions disposed on an upper and a lower end portions of the annular magnet and a pair of depending portions depending from the circular portions for covering a part of the outer peripheral surface of the annular magnet, the circular gap is formed between the end portions of the depending portions.

10. A disk drive motor according to claim 7, wherein the annular magnet is magnetized in the axial direction.

11. A disk drive motor according to claim 7, wherein the width of the circular gap is established so that a magnetic attracting force of the magnetic flux leakage of the annular magnet is balanced with the centrifugal force.

12. A disk drive motor according to claim 7, wherein a cushioning member is provided on the outside of the magnetic pieces.

* * * * *